Dec. 23, 1952            A. GEYER            2,622,700
SPRING MOTOR
Filed April 26, 1950                            2 SHEETS—SHEET 1
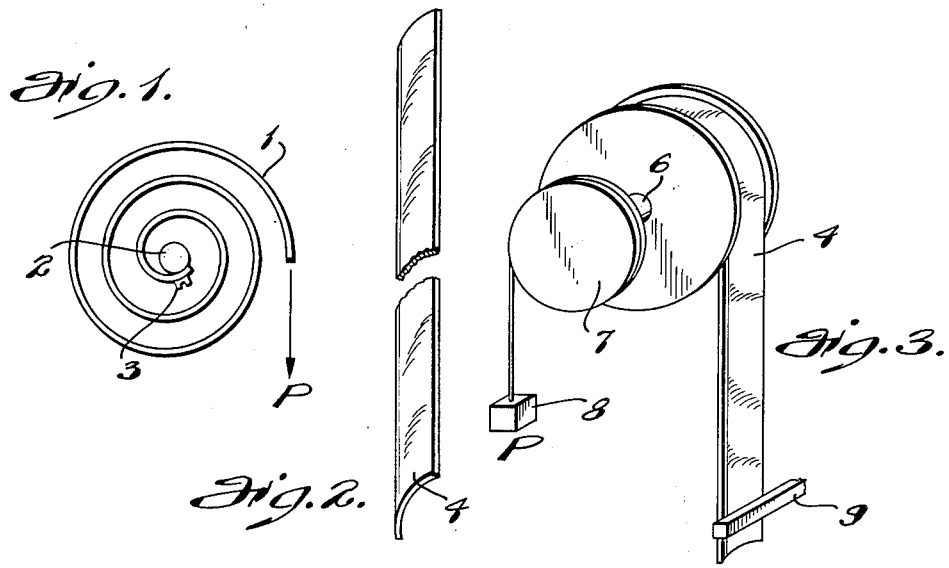
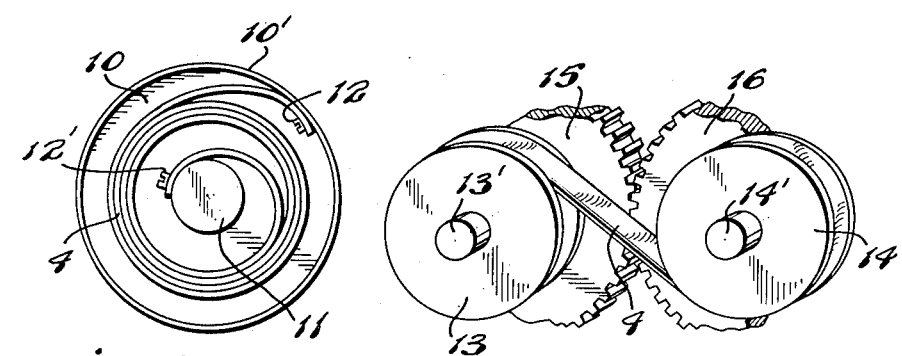
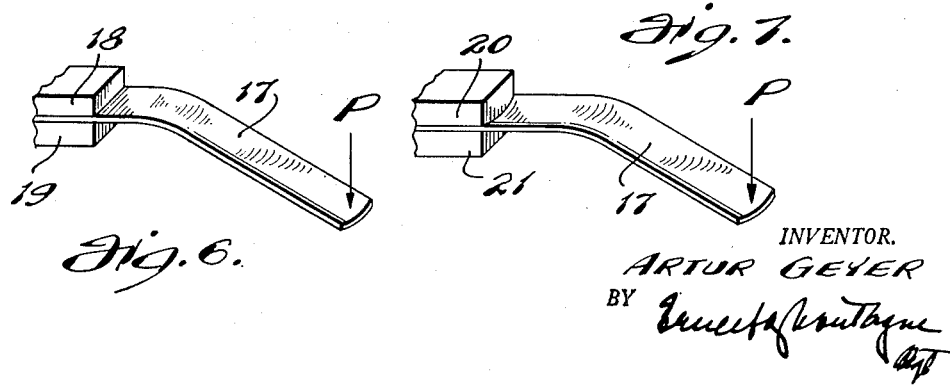
INVENTOR.
ARTUR GEYER
BY Dec. 23, 1952        A. GEYER        2,622,700

SPRING MOTOR

Filed April 26, 1950        2 SHEETS—SHEET 2

Inventor:
Arthur Geyer
by
[signature]

Patented Dec. 23, 1952

2,622,700

UNITED STATES PATENT OFFICE 2,622,700

SPRING MOTOR

Artur Geyer, Kempten, Germany

Application April 26, 1950, Serial No. 158,137
In Germany May 2, 1949

3 Claims. (Cl. 185—37)

1

The present invention relates to a spring motor and more particularly to a spring motor having a resilient hand connected at one end thereof to a member.

It is an object of the present invention to provide a simple spring motor of the kind described which has a relatively small volume and weight.

It is another object of the present invention to provide a spring motor of the kind described which yields a uniform torque for a relatively long time.

A spring motor according to the present invention is particularly suitable as a driving mechanism for cinecameras, record players, typewriter carriages, mechanical toys, clockworks, etc.

A spring motor according to the present invention comprises a member, a resilient band having a concavo-convex cross-section, the band being fixed with one end thereof to the member, and means for utilizing the cross-elasticity of the band in the longitudinal direction thereof. Preferably the resilient band consists of spring steel and the cross-section thereof has the shape of a circular arc.

In an embodiment of the present invention, the radius of the circular arc changes gradually in the same sense, i. e. increases or decreases, from one end of the band to the other.

In one embodiment of the present invention the resilient band is wound in a spiral about the member and has the concave or the convex face turned toward the member.

In an embodiment of the present invention a rectilinear guiding member is arranged at the other end of the band which is not connected to the member.

An embodiment of the present invention comprises in combination a substantially cylindrical casing having a curved wall, a member rotatably secured to the center of the casing, and a resilient band consisting of spring steel and having a concavo-convex cross-section, the band being fixed with one end thereof to the member and with the other end thereof to the curved wall of the casing, the mid-portion of the band being arranged in a spiral arranged within the casing and surrounding the member. The spiral is preferably spaced apart from both the curved wall of the casing and the member.

A preferred embodiment of the present invention comprises a first shaft, a second shaft arranged parallel to the first shaft, and a resilient band consisting of spring steel and having a concavo-convex cross-section, the band being fixed with the ends thereof to the first shaft and

2 to the second shaft, respectively, the band being adapted to be wound in a spiral on one of the shafts and unwound from the other of the shafts and vice versa.

Preferably gear wheels are rigidly connected to the shafts, respectively, and in engagement with each other.

According to another embodiment of the present invention the spring motor comprises a stationary member, a relatively short spring sheet band having a substantially concavo-convex cross-section, and means for holding the band with one end thereof by the stationary member on both sides of the cross-section of the band, the band being adapted to be put under tension by deflecting the band at right angles to the plane of holding the band by the stationary member.

The cross-section of the holding means may be substantially flat or may be concavo-convex so as to adapt itself to the circular cross-section of the band.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a plan view of a well-known spring motor having a spiral band connected at one end thereof to a member;

Fig. 2 shows in perspective view a spring steel band used according to the present invention;

Fig. 3 is a perspective view of one embodiment of the present invention;

Fig. 4 is a plan view with the cover removed of another embodiment of the present invention;

Fig. 5 is a perspective view of a further embodiment of the present invention;

Fig. 6 is a perspective view of still another embodiment of the present invention;

Fig. 7 is a perspective view similar to Fig. 6 showing a modification thereof.

Figure 8:
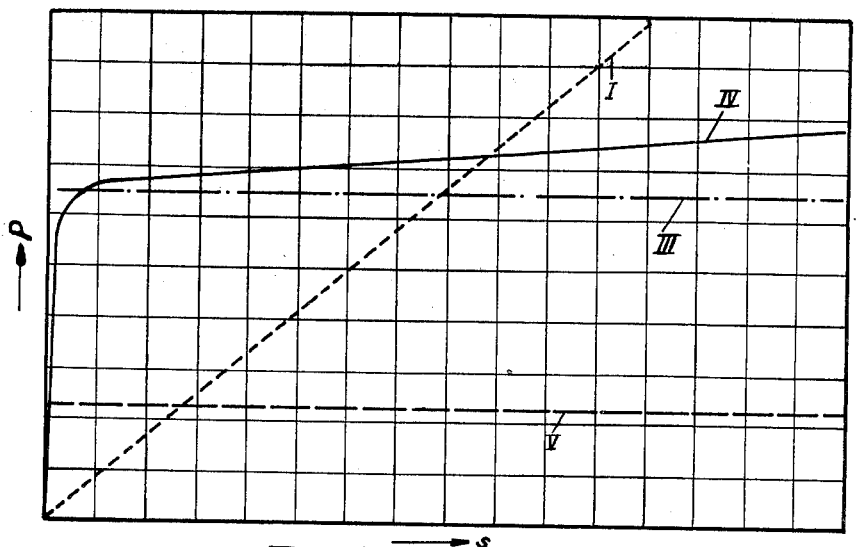
Figs. 8 and 9 are diagrams showing characteristics denoted by I, III, IV, V, VI, and VII, of the various spring motors shown in Figs. 1, 3, 4, 5, 6 and 7, respectively.

Referring now to the drawings and first to Fig. 1, a band having a flat cross-section is spirally wound around a member or shaft 2 to which it is attached with one of its ends 3. The band is wound by exerting a force in the direction of the arrow P and exerts a force in the opposite direction after the band has been wound on the member 2.

According to the invention a band 4 is used in the spring motor, said band having a concavo-convex cross-section. Such a band which preferably consists of spring steel has two components of elasticity. One is the deflecting force in the longitudinal direction of the band which has hitherto been used for spring motors as shown in Fig. 1. The second component is a cross-elasticity which has an effect in the longitudinal direction of the band. This second component does not arise in ordinary spring motors such as shown in Fig. 1 having a flat band but is characteristic of a concavo-convex band as shown at 4 in Fig. 2. With such a band considerably larger forces can be stored at equal weight than with bands having a flat cross-section. The concavo-convex shape of the cross-section imparts to the spring-steel band an additional stiffness in longitudinal direction which operates only above a certain radius of the spirally wound band as an additional force in the longitudinal direction thereof. If this predetermined radius is not reached, only the longitudinal deflection is effective as in the hitherto usual spring motors.

Thus it will be seen that the total useful force of a concavo-convex band is composed of two parts corresponding to the cross-elasticity and the longitudinal elasticity, respectively. If the component due to the longitudinal elasticity is small in comparison to the component due to the cross-elasticity a substantially constant torque is delivered by the spring over its entire length. If this equalization of the torque is not sufficient, which may happen in particular cases, the radius of the concavo-convex cross-section may be gradually changed in the same sense from one end of the band to the other.

The effect of the concavo-convex band depends on whether it is wound on the member with the concave or convex curve turned toward the member. According to the requirements to be met in an individual case the concave or convex face of the band is turned toward the member.

Furthermore the constant torque of the spring motor is determined by the ratio of the radius of the cross-section and the width and the strength of the spring. Another factor to be taken in consideration is the choice of the steel and its preliminary treatment.

Referring now to Fig. 3 of the drawings, the resilient band 4 is wound on a member 5 shaped in this embodiment as a drum having a shaft 6 provided with a preferably smaller pulley 7 to which is attached a weight 8 representing the winding force. The spring band 4 has a rectilinear free end guided by a rectilinear guiding member 9. Figure 3 is purely diagrammatical and it should be understood that in a practical embodiment the weight 8 is to be replaced by a manually operated crank or a watch key.

Referring now to Fig. 4 the spring band 4 is arranged inside a substantially cylindrical casing 10 having a curved wall 10' to which the band 4 is attached at 12 with one end thereof. The casing contains a centrally arranged rotatable member or shaft 11 to which the other end of the spring is attached at 12'. The mid portion of the band 4 is arranged as a spiral arranged within the casing 10 and surrounding the member 11 and spaced apart from both the curved wall 10' of the casing and the member 11.

Referring now to Fig. 8, the characteristics of the spring motors shown in Figs. 1, 3 and 4, are represented by the curves denoted I, III and IV, respectively. As abscissa the number $s$ of the revolutions of the central member is used against which is plotted the torque P of the spring motor. It will be seen from Fig. 8 that the characteristic of the known spring motors shown in Fig. 1 is a straight line running through the origin and inclined at an angle to the horizontal. The motor according to Fig. 3 has on the contrary an almost completely horizontal characteristic III. The characteristic IV of the embodiment shown in Fig. 4 is steeply inclined at the beginning and goes over into a portion covering more than 90% of the running of the motor and having a very small inclination to the horizontal.

Referring now to Fig. 5 showing an embodiment of the invention in which the component of the longitudinal elasticity is entirely made ineffective, a first shaft 13' is arranged parallel to a second shaft 14'. The first shaft 13' carries a first drum 13 and a first gear wheel 15 whereas the second shaft 14' carries a second drum 14 and a second gear wheel 16 which is in engagement with the first gear wheel 15. The resilient band 4 is attached with its ends to the first shaft 13' and the second shaft 14', respectively, so that it is wound on one of the shafts with the concave surface thereof turned toward the shaft and on the other shaft with the convex surface thereof turned toward the other shaft. If the band is wound entirely on one of the drums, for instance the drum 14 and then released, the difference of the cross-elasticity of the band on the two drums 13 and 14 comes into operation so that the band 4 is unwound from the drum 14 and wound on the drum 13. In this operation only the part of the circular cross-section of the band between the drums comes into action so that the longitudinal component of the elasticity is rendered inoperative. The motor therefore has a constant torque during the entire running of the band from one drum to the other. As shown in Fig. 8, characteristic V, the efficiency of the spring motor is smaller at equal weight and equal cross-section of the band, than with the motors shown in Figs. 3 and 4 because only the difference of the cross-elastic forces is effective in the embodiment according to Fig. 5. The gear wheels 15 and 16 ensure a simultaneous rotation of the shafts 13' and 14' whenever one of the shafts is driven by hand or by the band 4.

Figure 9:
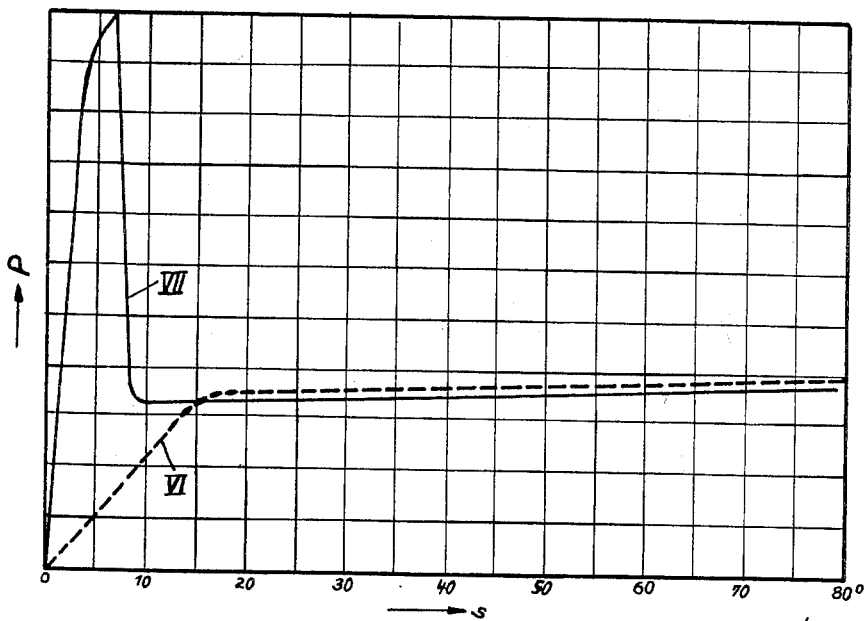

Referring now to Fig. 6, a very short steel spring band 17 having a concavo-convex cross-section is held at one end thereof between the two jaws 18 and 19 of a stationary member (not shown). In Fig. 6 the contacting surfaces of the jaws 18 and 19 are flat and the end of the spring 17 held by the jaws 18 and 19, is also flat. If the spring is deflected from its normal position in the direction of the arrow P acting substantially at right angles to the plane of holding the spring torque is yielded by the spring band shown in characteristic VI in Fig. 9, the abscissa of which is the angle by which the free end of the spring is deflected. The torque increases at the beginning steeply and is almost horizontal over the greater part of the curve. The spring can be deflected up to an angle of 80°.

Fig. 7 showing a modification of Fig. 6 has the relatively short spring 17 held by two jaws 20 and 21 which have curved contacts surfaces according to the concavo-convex cross-section of the spring 17. The upper jaw 20 has a convex contact surface and engages the concave face of the spring 17 whereas the lower jaw 21 has a concave contacting surface and is in contact with the convex face of the spring 17. This embodiment has a characteristic shown in Fig. 9 by the curve VII. It rises steeply until approximately 5° and falls then steeply until about 10° but to a value substantially in excess of 0. The remaining part of the curve VII has about the same shape as the remaining part of curve VI. Such a characteristic is very useful for certain applications for instance in locks which are not to unlock easily or should offer a high initial resistance, such as locks for doors of automobiles, swinging doors, doors for furniture, etc.

Spring motors according to the invention can be advantageously used in cases where hitherto counterweights for a load adjustable in height were used such as lamps suspended from an adjustable cable, enlarging apparatuses, Venetian blinds, pulley-operated windows, etc.

It will be understood that each of the elements described above, or two or more together, may also find a useful application in other types of spring motors differing from the types described above.

While I have illustrated and described the invention as embodied in a spring motor having a resilient band, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A spring motor, comprising in combination, a first shaft; a second shaft arranged parallel to said first shaft; a resilient band consisting of spring steel and having a concavo-convex cross-section, said band being fixed with the ends thereof to said first shaft and to said second shaft, respectively, said band being adapted to be wound in a spiral on one of said shafts and unwound from the other of said shafts and vice versa and means for ensuring a simultaneous rotation in opposite direction of said first shaft and said second shaft.

2. A spring motor, comprising in combination a first shaft; a first gear wheel rigidly connected to said first shaft; a second shaft arranged parallel to said first shaft; a second gear wheel rigidly connected to said second shaft and being in engagement with said first gear wheel; and a resilient band consisting of spring steel and having a concavo-convex cross-section, said band being fixed with the ends thereof to said first shaft and to said second shaft, respectively, said band being adapted to be wound in a spiral on one of said shafts and unwound from the other of said shafts and vice versa.

3. A spring motor, comprising in combination, a first shaft; a first gear wheel rigidly connected to said first shaft; a second shaft arranged parallel to said first shaft; a second gear wheel rigidly connected to said second shaft and being in engagement with said first gear wheel, said gear wheels ensuring a simultaneous rotation in opposite direction of said first shaft and said second shaft whenever one of said shafts is driven; and a resilient band consisting of spring steel and having a concavo-convex cross-section, said band being fixed with the ends thereof to said first shaft and to said second shaft, respectively, said band being adapted to be wound in a spiral on one of said shafts and unwound from the other of said shafts and vice versa.

ARTUR GEYER.

REFERENCES CITED

The following references are of record in the file of this patent:

UNITED STATES PATENTS

| Number | Name | Date |
| --- | --- | --- |
| 1,820,967 | Enyeart | Sept. 1, 1931 |
| 2,063,799 | Fornelius et al. | Dec. 8, 1936 |

FOREIGN PATENTS

| Number | Country | Date |
| --- | --- | --- |
| 139,050 | Great Britain | Feb. 26, 1920 |
| 181,861 | Switzerland | Mar. 16, 1936 |